United States Patent [19]
Slangan et al.

[11] 3,917,870
[45] Nov. 4, 1975

[54] ENHANCING GRAPE FLAVOR WITH 2-PHENYL-3-CARBOETHOXYFURAN AND BIS (CYCLOHEXYL) DISULFIDE

[75] Inventors: Gary Slangan, Toms River; Alan O. Pittet, Atlantic Highlands; Christopher Giacino, Califon; Denis E. Hruza, Sr., Brick Town, all of N.J.; Edward J. Shuster, Brooklyn, N.Y.

[73] Assignee: International Flavors & Fragrances Inc., New York, N.Y.

[22] Filed: Oct. 29, 1974

[21] Appl. No.: 518,818

Related U.S. Application Data

[63] Continuation-in-part of Ser. No. 401,665, Sept. 28, 1973, abandoned.

[52] U.S. Cl. .............. 426/535; 426/536; 252/522; 131/17
[51] Int. Cl.[2] ................................. A23L 1/235
[58] Field of Search ...................... 426/65, 175

[56] References Cited
UNITED STATES PATENTS

| | | | |
|---|---|---|---|
| 3,427,167 | 2/1969 | Michael et al. | 426/65 |
| 3,677,772 | 7/1972 | Mussinan | 426/65 |
| 3,702,253 | 11/1972 | Winter et al. | 426/65 UX |

*Primary Examiner*—Joseph M. Golian
*Attorney, Agent, or Firm*—Arthur L. Liberman, Esq.; Harold Haidt, Esq.

[57] ABSTRACT

Methods for preparing foodstuffs, flavoring compositions for foodstuffs, perfume compositions, ingredients for perfume compositions, tobacco compositions and flavoring compositions for tobacco by including therein 2-phenyl-3-carboethoxyfuran and/or bis (cyclohexyl) disulfide to produce:

a. In food flavorings, concord grape, wine, incense/fruity, pungent, sulfury (berry), minty, musty, weak sweet buttery, sweet carrot, dry woody cinnamon or warm benzaldehyde-nut like flavor notes or combinations of these and bitter after taste, benzoateester taste and heavy floral backnotes for improving the taste and aroma of artificial grape or other fruit flavoring compositions;
b. In perfumes, a sweet, balsamic slightly nutty and sulfurous notes; and
c. In tobacco flavorings, aromatic, sweet, resinous and balsamic-like notes as well as the foodstuff flavoring compositions, perfume compositions and tobacco compositions containing 2-phenyl-3-carboethoxyfuran and/or bis (cyclohexyl) disulfide.

2-Phenyl-3-carboethoxyfuran has the structure:

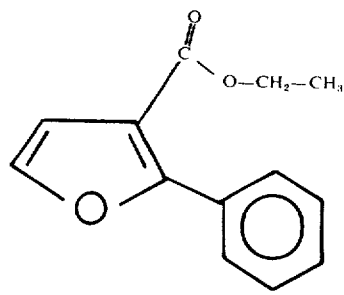

Bis (cyclohexyl) disulfide has the structure:

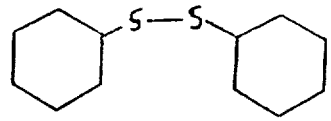

3 Claims, No Drawings

ENHANCING GRAPE FLAVOR WITH 2-PHENYL-3-CARBOETHOXYFURAN AND BIS (CYCLOHEXYL) DISULFIDE

This application is a continuation-in-part of U.S. application for Letters Patent Ser. No. 401,665 filed on Sept. 28, 1973 and now abandoned.

BACKGROUND OF THE INVENTION

The present invention relates to novel methods and compositions using 2-phenyl-3-carboethoxyfuran and/or bis (cyclohexyl) disulfide to alter the flavor and/or aroma of consumable materials.

There has been considerable work performed relating to substances which can be used to impart (or enhance) flavors to (or in) various consumable materials. These substances are used to diminish natural materials, some of which may be in short supply, and to provide more uniform properties in the finished product. Concord grape, wine incense/fruity, pungent, sulfury (berry), minty, musty, weak sweet buttery, sweet carrot, dry woody cinnamon or warm benzaldehyde-nut like flavor notes or combinations of these and bitter after taste, benzoate-ester taste and heavy floral backnotes for improving the taste and aroma of artificial grape or other fruity flavoring compositions are particularly desirable for many uses in consumable articles, e.g., foodstuffs. Sweet, balsamic, slightly nutty and sulfurous notes are particularly desirable in perfume compositions. Aromatic, sweet, resinous and balsamic-like notes are particularly desirable in tobacco.

In U.S. Pat. No. 3,677,772, sulfide derivatives suitable for use in meat flavors are represented by the following structural formula:

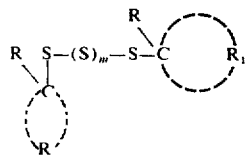

wherein R represents hydrogen or lower alkyl of 1 to 6 carbon atoms and $R_1$ represents the carbon atoms necessary to complete a cycloalkyl group, containing from 4 to 9 intracyclic carbon atoms and m is 1 or 2.

Also disclosed in U.S. Pat. No. 3,677,772 is the formulation of cycloalkyl mercaptans in situ with the remaining ingredients of the flavoring or foodstuff composition carried out by employing as the precursor, a mercaptal and/or hemimercaptal capable of yielding the desired cycloalkyl mercaptan by simple hydrolysis, e.g., at refluxing temperatures. Particularly described as suitable for such use is the mercaptal formed on the addition of acetaldehyde to cyclopentyl mercaptan, such mercaptal having the following structural formula:

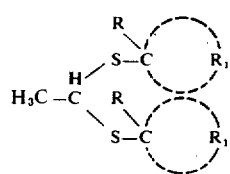

wherein R and $R_1$ have the aforedescribed significance.

As mentioned on page 442 of "The Chemistry and Physiology of Flavors" (Schultz, Day and Libbey, Avi Publishing Company, 1967), 2-acetylfuran is present in coffee flavors. On pages 218 and 219 of the same publication, ethyl phenyl acetate and 2-phenethyl caproate are mentioned as being one of the volatile esters of wine aroma.

Bis (cyclohexyl)disulfide is prepared according to the process set forth in U.S. Pat. No. 2,517,934 issued Aug. 8, 1950.

2-Phenyl-3-carboethoxyfuran is prepared according to the process set forth by I. H. Kondo and H. Suzuki in J.Pharm.Soc. Japan No. 544, 501–5 (1927).

THE INVENTION

It has now been discovered that novel solid and liquid foodstuff and flavoring compositions having concord grape, wine, incense/fruity, pungent, sulfuryberry, minty, musty, weak sweet buttery, sweet carrot, dry woody cinnamon or warm benzaldehyde-nut like flavor notes or combinations of these and bitter after taste, benzoate-ester taste and heavy floral backnotes for improving the taste and aroma of artificial grape or other fruit flavoring compositions; novel aroma imparting compositions having sweet, balsamic, slightly nutty and sulfurous notes and novel tobacco flavors having an aromatic, sweet, resinous and balsamic-like note can be created by the utilization of 2-phenyl-3-carboethoxyfuran and/or bis (cyclohexyl) disulfide in flavor and fragrance formulae, and/or in foodstuffs, perfumes and tobaccos.

When used as a food flavor or food additive or enhancer, either separately or in combination, the organoleptic properties of the 2-phenyl-3-carboethoxyfuran and/or bis (cyclohexyl) disulfide of our invention are described as follows:

1. 2-Phenyl-3-carboethoxyfuran:
   At 1 ppm has a weak, sweet, buttery taste; at 2 ppm has a sweet carrot and concord grape-like taste; at 5 ppm has a characteristic benzoate-ester taste. At 20 ppm has an Italian Spumoni-like character; and a sweet, warm benzaldehyde nutlike aroma with a heavy floral backnote.

2. Bis (cyclohexyl) disulfide:
   In 1% solution (food-grade ethanol) has a fruity, pungent, sulfury aroma and a sweet, nutty sulfuryberry taste with minty, bitter, musty notes. Its threshhold level is 1 ppm.

When the 2-phenyl-3-carboethoxyfuran and/or bis (cyclohexyl) disulfide of our invention is used as a food flavor adjuvant, the nature of the co-ingredients included with the said 2-phenyl-3-carboethoxyfuran and/or bis (cyclohexyl) disulfide in formulating the product composition will also serve to alter the organoleptic characteristics of the ultimate foodstuffs treated therewith. As used herein in regard to flavor, the term "alter" in its various forms means "supplying or imparting flavor character or note to otherwise bland, relatively tasteless substance or augmenting or enhancing the existing flavor characteristic where a natural flavor is deficient in some regard or supplementing the existing flavor impression to modify its quality, character or taste". As used herein, the term "foodstuff" includes both solid and liquid ingestible materials which usually do, but need not have nutritional value. Thus, foodstuffs include meats, gravies, soups, convenience foods, beverages, dairy products, candies, vegetables, cereals, soft drinks, snacks, chewing gum, chewable vitamin tablets and the like.

Substances suitable for use herein as coingredients or flavoring adjuvants are well known in the art for such use being extensively described in the relevant literature. Apart from the requirement that any such material be "ingestibly" acceptable and thus non-toxic or otherwise non-deleterious nothing particularly critical resides in selection thereof. Accordingly, such materials which may in general be characterized as flavoring adjuvants or vehicles comprise broadly stabilizers, thickeners, surface active agents, conditioners, other flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2- and 3-tertiary-butyl-4-hydroxyanisole), butylated hydroxy toluene (2,6-di-tertiarybutyl-4-methyl phenol), propyl gallate and the like, and sequestrants, e.g., citric acid.

Thickener compounds include carriers, binders, protective colloids, suspending agents, emulsifiers and the like, e.g., agaragar; carrageenan; cellulose; and cellulose derivatives such as carboxymethyl cellulose and methyl cellulose; natural and synthetic gums such as gum arabic, gum tragacanth; gelatin, proteinaceous materials; lipids; carbohydrates; starches pectins, and emulsifiers, e.g., mono-and diglycerides of fatty acids, skim milk powder, hexoses, pentoses, disaccharides, e.g., sucrose, corn syrup solids and the like.

Surface active agents include emulsifiying agents, e.g., fatty acids such as capric acid, caprylic acid, palmitic acid, myristic acid and the like, mono-and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcumin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources, such as zinc chloride, zinc sulfate and the like.

Other flavorants and flavor intensifiers include organic acid, e.g., fatty saturated acids, unsaturated acids and amino acids; alcohols, e.g., primary and secondary alcohols, esters; carbonyl compounds, e.g., aldehydes and ketones as well as lactones; cyclic organic materials including benzene derivatives isocyclics, heterocyclics such as furans particularly 2,5-dimethyl-3-acetyl furan and 2-methyl-2,3-dihydro furan-3-one, pyridines, pyrazines (particularly monoalkyl, dialkyl, trialkyl and tetraalkyl substituted pyrazines) and the like, sulfur-containing materials including thiazoles, disulfides, thiols, sulfides, aldehydes (for example, 3-phenyl-4-pentenal, 3-phenyl-3-pentenal, 3-phenyl-2-pentenal, 2-phenyl-2-pentenal, and 2-phenyl-3-methyl-2-butenal); trisulfides and the like; other flavor potentiators such as monosodium glutamate, guanylates, inosinates, natural and synthetic flavorants such as vanillin, ethyl vanillin, diacetyl, phenethyl-2-furoate, maltol, natural gums and the like; spices, herbs, essential oils and extractives including "bitterness principles" such as theobromine, caffeine, naringin and other suitable materials creating a bitter effect.

The specific flavoring adjuvant selected for use may be either solid or liquid depending upon the desired physical form of the ultimate product i.e., foodstuff, whether simulated or natural, and should, in any event, be capable of providing an environment in which the 2-phenyl-3-carboethoxyfuran and/or bis (cyclohexyl) disulfide can be dispersed or admixed to provide a homogeneous medium. In addition, selection of one or more flavoring adjuvants as well as the quantities thereof will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of 2-phenyl-3-carboethoxyfuran and/or bis (cyclohexyl) disulfide employed in a particular instance can vary over a relatively wide range whereby to its desired organoleptic effects. All parts and percentages given herein are by weight unless otherwise specified. Thus, correspondingly, greater amounts would be necessary in those instances wherein the ultimate food composition to be flavored is relatively bland to the taste, whereas relatively minor quantities may suffice for purposes of enhancing the composition merely deficient in natural flavor or aroma. Thus, the primary requirement is that the amount selected to be effective, i.e., sufficient to alter the organoleptic characteristics of the parent composition, whether foodstuff per se or flavoring composition. Thus, the use of insufficient quantities of 2-phenyl-3-carboethoxyfuran and/or bis (cyclohexyl) disulfide will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions it has been found that quantities of 2-phenyl-3-carboethoxyfuran and/or bis (cyclohexyl) disulfide ranging from a small but effective amount, e.g., 0.02 parts per billion up to about 0.1% (1000 parts per million) by weight based on total composition are suitable. Concentrations in excess of the maximum quantity stated are not normally recommended since they fail to provide commensurate enhancement or organoleptic properties. In those cases, wherein the 2-phenyl-3-carboethoxyfuran and/or bis (cyclohexyl) disulfide is added to the foodstuff as an integral component of the flavoring composition, it is, of course, essential that the total quantity of flavoring composition employed be sufficient to yield an effective 2-phenyl-3-carboethoxyfuran and/or bis (cyclohexyl) disulfide concentration in the foodstuff product.

Further with respect to ultimate food compositions, it has been found that when mixtures of 2-phenyl-3-carboethoxyfuran and bis (cyclohexyl) disulfide are used to alter the flavor of foodstuffs, the ratio of 2-phenyl-3-carboethoxyfuran:bis (cyclohexyl) disulfide is preferably in the range of from 1.5:0.02 up to about 1.5:0.15, the bis (cyclohexyl) disulfide being the more potent of the two chemical compounds with regard to their respective organoleptic characteristics in food compositions. It is noteworthy that when the two compounds, 2-phenyl-3-carboethoxyfuran and bis (cyclohexyl) disulfide, are used together with one another to alter the grape flavor of a foodstuff, a more natural grape flavor is imparted to said foodstuff than when either is used alone.

Food flavoring compositions prepared in accordance with the present invention preferably contain 2-phenyl-3-carboethoxyfuran and/or bis (cyclohexyl) disulfide in concentrations ranging from about 0.0006% up to about 10% by weight based on a total weight of said flavoring composition.

The compositions described herein can be prepared according to conventional techniques well known as typified by cake batters and fruit juices and vegetable juices and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the 2-phenyl-3-carboethoxyfuran and/or bis (cyclohexyl) disulfide with for example gum arabic, gum tragacanth, carrageenan and the like and thereafter spray-drying the resultant mixture whereby to obtain the particular solid product. Pre-prepared flavor mixes in powder form, e.g., a red currant mix or a fruit flavored powder obtained by mixing dried solid components, e.g., starch, sugar and the like and 2-phenyl-3-carboethoxyfuran and/or bis (cyclohexyl) disulfide in a dry blender until the requisite degree of uniformity is achieved.

It is presently preferred to combine the 2-phenyl-3-carboethoxyfuran and/or bis (cyclohexyl) disulife with the following adjuvants;

Methyl anthranilate;
Ethyl acetate;
Ethyl anthranilate;

Ethyl butyrate;
Ethyl methyl phenyl glycidate;
Cinnamic alcohol;
Amyl valerianate;
Cinnamyl propionate;
Rhodinyl acetate;
Methyl beta-hydroxy butyrate; and
Ethyl beta-hydroxy butyrate
2-Phenyl-3-carboethoxyfuran and/or bis (cyclohexyl) disulfide and an auxiliary perfume ingredient, for example, alcohols, aldehydes, nitriles, esters, cyclic esters and natural essential oils may be admixed so that the combined odors of the individual components produce a pleasant or desired fragrance. Such perfume compositions usually contain (a) the main note or the "bouquet" or foundation stone of the composition; (b) modifiers which round off and accompany the main note; (c) fixatives which include odorous substances which lend a particular note to the perfume throughout all stages of evaporation and substances which retard evaporation; and (d) topnotes which are usually low boiling fresh smelling materials.

In perfume compositions, the individual component will contribute its particular olfactory characteristics but the over-all effect of the perfume composition will be the sum of the effects of each of the ingredients. Thus, the 2-phenyl-3-carboethoxyfuran and/or bis (cyclohexyl) disulfide can be used to alter the aroma characteristics of a perfume composition, for example, by utilizing or moderating the olfactory reaction contributed by another ingredient in the composition.

The amount of the 2-phenyl-3-carboethoxyfuran and/or bis (cyclohexyl) disulfide of our invention which will be effective in perfume compositions depend on many factors including the other ingredients, their amounts and the effects which are desired. It has been found that perfume compositions containing as little as 0.05% of 2-phenyl-3-carboethoxyfuran and/or bis (cyclohexyl) disulfide or even less can be used to impart a sweet, slightly sulfurous top note found in orange flower and a deep, balsamic, slightly nutty undertone essential to orange flower to soaps, cosmetics and other products. The amount employed can range up to 5% of the fragrance components and will depend on considerations of cost, nature of the end product, the effect desired in the finished product and the particular fragrance sought.

2-Phenyl-3-carboethoxyfuran and/or bis (cyclohexyl) disulfide are useful in perfume compositions as olfactory components in detergents, and soaps; space odorants and deodorants; perfumes; colognes; toilet water; bath preparations such as bath oils and bath solids; hair preparations such as lacquers, brilliantines, pomades and shampoo; cosmetic preparations such as creams, deodorants, hand lotions and sunscreens; powders, such as talcs, dusting powders, face powders and the like. When used as an olfactory component of a perfumed article, as little as 100 parts per million of the 2-phenyl-3-carboethoxyfuran and/or bis (cyclohexyl) disulfide will suffice to impart a sweet, slightly sulfurous top note found in orange flower and a deep, balsamic, slightly nutty undertone essential to orange flower. Generally, no more than 0.5% of 2-phenyl-3-carboethoxyfuran and/or bis (cyclohexyl) disulfide based on the ultimate end product is required in the perfume composition.

In addition, the perfume composition or fragrance composition of this invention contain a vehicle or carrier for the 2-phenyl-3-carboethoxyfuran and/or bis (cyclohexyl) disulfide. The vehicle can be a liquid such as an alcohol, a non-toxic alcohol, a non-toxic glycol or the like. The carrier can also be an absorbent solid such as a gum (e.g., gum arabic) or components for encapsulating the composition (such as gelatine).

It will thus be apparent that 2-phenyl-3-carboethoxyfuran and/or bis (cyclohexyl) disulfide can be utilized to alter the sensory properties, particularly organoleptic properties such as flavor and/or fragrances of a wide variety of consumable materials.

An additional aspect of our invention provides an organoleptically improved smoking tobacco product and additives thereof, as well as methods of making the same which overcome specific problems heretofore encountered in which specific desired sweet and resinous, balsamic flavor characteristics of natural tobacco are created or enhanced and may be readily controlled and maintained at the desired uniform level regardless of variations in the tobacco components of the blend.

This invention further provides improved tobacco additives and methods whereby desirable sweet and resinous, balsamic flavor characteristics may be imparted to smoking tobacco products and may be readily varied and controlled to produce the desired uniform flavoring characteristics.

In carrying out this aspect of our invention, we add to smoking tobacco materials or a suitable substitute therefor (e.g., dried lettuce leaves) an aroma and flavor additive containing as an active ingredient, 2-phenyl-3-carboethoxyfuran.

In addition to the 2-phenyl-3-carboethoxyfuran of our invention other flavoring and aroma additives may be added to the smoking tobacco material or substitute therefor either separately or in mixture with the 2-phenyl-3-carboethoxyfuran as follows:

I. Synthetic Materials
Beta-ethyl-cinnamaldehyde;
Eugenol;
Dipentene;
Damascenone;
Maltol;
Ethyl maltol;
Delta undecalactone;
Delta decalactone;
Benzaldehyde;
Amyl acetate;
Ethyl butyrate;
Ethyl valerate;
Ethyl acetate;
2-Hexenol-1,2-methyl-5-isopropyl-1,3-nonadiene-8-one;
2,6-Dimethyl-2,6-undecadiene-10-one;
2-Methyl-5-isopropyl acetophenone;
2-Hydroxy-2,5,58a-tetramethyl-1-(2-hydroxyethyl)-decahydronaphthalene;
Dodecahydro-3a-6,6,9a-tetramethyl naphtho-(2,1-b)-furan;
4-Hydroxy hexanoic acid, gamma lactone;
Polyisoprenoid hydrocarbons defined in Example V of U.S. Pat. No. 3,589,372 issued on June 29, 1971.

II. Natural Oils
Celery seed oil;
Coffee extract;
Bergamot oil;
Cocoa extract;
Nutmeg oil;
Origanum oil.

An aroma and flavoring concentrate containing 2-phenyl-3-carboethoxyfuran and, if desired, one or more of the above indicated additional flavoring additives may be added to the smoking tobacco material, to the filter or to the leaf or paper wrapper. The smoking tobacco material may be shredded, cured, cased and blended tobacco material or reconstituted tobacco material or tobacco substitutes (e.g., lettuce leaves) or mixtures thereof. The proportions of flavoring additives may be varied in accordance with taste but insofar as enhancement or the imparting of sweet and resinous, balsamic-like notes, we have found that satisfactory results are obtained if the proportion by weight of the sum total of 2-phenyl-3-carboethoxyfuran to smoking tobacco material is between 100 ppm and 6000 ppm (0.01–0.60%) of the active ingredients to the smoking tobacco material. We have further found that satisfactory results are obtained if the proportion by weight of the sum total of 2-phenyl-3-carboethoxyfuran used to flavoring material is between 0.005 and 0.60.

Any convenient method for incorporating the 2-phenyl-3-carboethoxyfuran in the tobacco product may be employed. Thus, the 2-phenyl-3-carboethoxyfuran taken alone or along with other flavoring additives may be dissolved in a suitable solvent such as ethanol, pentane, diethyl ether and/or other volatile organic solvents and the resulting solution may either be spread on the cured, cased and blended tobacco material or the tobacco material may be dipped into such solution. Under certain circumstances, a solution of 2-phenyl-3-carboethoxyfuran taken alone or taken further together with other flavoring additives as set forth above, may be applied by means of a suitable applicator such as a brush or roller on the paper or leaf wrapper for the smoking product, or it may be applied to the filter by either spraying, or dipping, or coating.

Furthermore, it will be apparent that only a portion of the tobacco or substitute therefor need be treated and the thus treated tobacco may be blended with other tobaccos before the ultimate tobacco product is formed. In such cases, the tobacco treated may have the 2-phenyl-3-carboethoxyfuran in excess of the amounts or concentrations above indicated so that when blended with other tobaccos, the final product will have the percentage within the indicated range.

In accordance with one specific example of our invention an aged, cured and shredded domestic burley tobacco is spread with a 20% ethyl alcohol solution of 2-phenyl-2-carboethoxyfuran in an amount to provide a tobacco composition containing 800 ppm by weight of 2-phenyl-3-carboethoxyfuran on a dry basis. Thereafter, the alcohol is removed by evaporation and the tobacco is manufactured into cigarettes by the usual techniques. The cigarette when treated as indicated has a desired and pleasing aroma which is detachable in the main and side streams when the cigarette is smoked. This aroma is described as being sweeter, rich, less harsh and having sweet, resinous, balsamic-like notes.

While our invention is particularly useful in the manufacture of smoking tobacco, such as cigarette tobacco, cigar tobacco, and pipe tobacco, other tobacco products formed from sheeted tobacco dust or fines may also be used. Likewise, the 2-phenyl-3-carboethoxyfuran of our invention can be incorporated with materials such as filter tip materials, seam paste, packaging materials and the like which are used along with tobacco to form a product adapted for smoking. Furthermore, the 2-phenyl-3-carboethoxyfuran can be added to certain tobacco substitutes of natural or synthetic origin (e.g., dried lettuce leaves) and, accordingly, by the term "tobacco" as used throughout this specification is meany any composition intended for human consumption, by smoking or otherwise, whether composed of tobacco plant parts or substitute materials or both.

The following examples are given to illustrate embodiments of the invention as it is presently preferred to practice it. It will be understood that these examples are illustrative, and the invention is not to be considered as restricted thereto except as indicated in the appended claims.

EXAMPLE 1

Perfume Formulation

The following mixture is prepared:

| Ingredients | Parts by Weight |
| --- | --- |
| Indol | 13 |
| Dimethyl Benzyl Carbinyl Acetate | 2 |
| Methyl Furoate | 3 |
| Jasmone Cis | 3 |
| Phenol 10% | 5 |
| Methyl Anthranilate | 5 |
| Bitter Orange Terpeneless 10% | 8 |
| Terpineol Coeur | 7 |
| Guaiacwood | 10 |
| Armoise 10% | 5 |
| Nerol | 5 |
| Eau des bruts | 1 |
| Bitter Orange Oil | 8 |
| Phenyl Ethyl Alcohol Coeur | 15 |
| Nerolidol | 7 |
| Benzaldehyde | 1.5 |
| Farnesol | 35 |
| Linalool Synthetic | 180 |
| Linalyl Acetate | 90 |
| Bis (Cyclohexyl) Disulfide | 0.5 |
| 2-Phenyl-3-Carboethoxyfuran | 10 |

The bis (cyclohexyl) disulfide imparts to this formulation of sweet, slightly sulfurous top note found in orange flower and the 2-phenyl-3-carboethoxyfuran imparts a deep, balsamic, slightly nutty undertone essential to orange flower.

EXAMPLE II

Preparation of Soap Composition

One hundred grams of soap chips are mixed with one gram of the perfume composition of Example I until a substantially homogeneous composition is obtained. The perfumed soap composition exhibits an orange flower fragrance containing a sweet, slightly sulfurous top note found in orange flower and a deep, balsamic, slightly nutty undertone essential to orange flower.

EXAMPLE III

Preparation of a Detergent Composition

A total of 100 grams of a detergent powder is mixed with 0.15 grams of the perfume composition of Example I until a substantially homogeneous composition is prepared. This composition exhibits an orange flower fragrance containing a sweet, slightly sulfurous top note found in orange flower and a deep, balsamic, slightly nutty undertone essential to orange flower.

EXAMPLE IV

Preparation of a Cosmetic Powder Composition

A cosmetic powder is prepared by mixing in a ball mill, 100 grams of talcum powder with 0.25 grams of bis (cyclohexyl) disulfide and 0.25 grams of 2-phenyl-3-carboethoxyfuran. It has a sweet, slightly sulfurous top note found in orange flower and a deep, balsamic, slightly nutty undertone essential to orange flower.

EXAMPLE V

Perfumed Liquid Detergent

Concentrated liquid detergent with an orange flower character is obtained containing 0.10%, 0.15% and 0.20% and bis (cyclohexyl) disulfide and 2-phenyl-3-carboethyoxyfuran. It is prepared by adding and homgenously mixing the appropriate quantity of bis (cyclohexyl) disulfide and 2-phenyl-3-carboethoxyfuran in the liquid detergent. The detergents all possess a sweet, slightly sulfurous top note and a deep, balsamic, slightly nutty undertone, the intensity increasing with greater concentrations of bis (cyclohexyl) disulfide and 2-phenyl-3-carboethoxyfuran.

EXAMPLE VI

Cologne

Bis (cyclohexyl) disulfide and 2-phenyl-3-carboethoxyfuran is incorporated in a cologne at a concentration of 2.5% and 85% aqueous ethanol; and into a handkerchief perfume at a concentration of 5% (in 95% aqueous ethanol). A distinct and definite orange flower fragrance containing a sweet, slightly sulfurous top note found in orange flower and a deep, balsamic, slightly nutty undertone essential to orange flower is imparted to the cologne and to the handkerchief perfume.

EXAMPLE VII

The composition of Example I is incorporated in a cologne at a concentration of 2.5% in 85% aqueous ethanol; and into a handkerchief perfume at a concentration of 20% (in 95% aqueous ethanol). The composition of Example I affords a distinct and definite orange flower fragrance containing a sweet, slightly sulfurous top note found in orange flower and a deep, balsamic, slightly nutty undertone essential to orange flower to that handkerchief perfume and cologne.

EXAMPLE VIII

Perfume Formulation

The following mixture is prepared:

| Ingredients | Parts by Weight |
| --- | --- |
| Indol | 3 |
| Heliotropin | 80 |
| Cinnamic Alcohol | 60 |
| Terpineol Coeur | 400 |
| Phenyl Ethyl Alcohol Coeur | 100 |
| Aubepine | 100 |
| Benzyl Alcohol | 50 |
| Benzyl Acetate | 50 |
| 4-(4-Hydroxy-4-methylpentyl)-3-cyclohexene-1-carboxaldehyde | 50 |
| Styrax Coeur | 50 |
| Linalool | 20 |
| Hexyl Cinnamic Aldehyde | 25 |
| Phenylacetaldehyde | 3 |
| Para Methyl Acetophenone | 5 |
| Cortex Aldehyde 50 | 10 |
| Eugenol | 20 |
| Isoeugenol | 20 |
| Indisan | 10 |
| Anisic Alcohol | 5 |
| 1,3,4,6,7,8-Hexahydro-4,6,6,7,8,8-hexamethyl-cyclopenta-gamma-2-benzopyran | 5 |
| Styrene | 1 |
| 2-Phenyl-3-Carboethoxyfuran | 5 |

The 2-phenyl-3-carboethoxyfuran imparts to this lilac formulation a low keyed sweet, balsamic, slightly nutty note.

EXAMPLE IX

Preparation of Soap Composition

One hundred grams of soap chips are mixed with one gram of the perfume composition of Example VIII until a substantially homogeneous composition is obtained. The perfumed soap composition exhibits a lilac fragrance having a low keyed sweet, balsamic, slightly nutty note.

EXAMPLE X

Preparation of a Detergent Composition

A total of 100 grams of a detergent powder is mixed with 0.15 grams of the perfume composition of Example VIII until a substantially homogeneous composition is prepared. This composition exhibits a lilac fragrance having a low keyed sweet balsamic, slightly nutty note.

EXAMPLE XI

Preparation of a Cosmetic Powder Composition

A cosmetic powder is prepared by mixing in a ball mill, 100 grams of talcum powder with 0.25 grams of 2-phenyl-3-carboethoxyfuran. It has a low keyed sweet, balsamic, slightly nutty note.

EXAMPLE XII

Perfumed Liquid Detergent

Concentrated liquid detergent with a low keyed, sweet, balsamic, slightly nutty note is obtained containing 0.10%, 0.15% and 0.20% of 2-phenyl-3-carboethoxyfuran. It is prepared by adding and homogeneously mixing the appropriate quantity of 2-phenyl-3-carboethoxyfuran in the liquid detergent. The detergents all possess a low keyed sweet, balsamic, slightly nutty note, the intensity increasing with greater concentrations of 2-phenyl-3-carboethoxyfuran.

EXAMPLE XIII

Cologne

2-Phenyl-3-carboethoxyfuran is incorporated in a cologne at a concentration of 2.5% in 85% aqueous ethanol; and into a handkerchief perfume at a concentration of 5% (in 95% aqueous ethanol). A distinct and definite low keyed sweet, balsamic, slightly nutty note is imparted to the cologne and to the handkerchief perfume.

EXAMPLE XIV

The composition of Example VIII is incorporated in a cologne at a concentration of 2.5% in 85% aqueous ethanol; and into a handkerchief perfume at a concentration of 20% (in 95% aqueous ethanol). The composition of Example VIII affords a lilac aroma having a distinct and definite low keyed sweet, balsamic, slightly nutty note to that handkerchief perfume and cologne.

EXAMPLE XV

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | 0.3 |
| Cognac oil | 0.1 |
| Ethyl alcohol | 73.6 |

The above mixture is judged to be an acceptable grape flavor when evaluated in a sweetened in acidified aqueous tasting solution. 1.5 Parts of 2-phenyl-3-carboethoxyfuran is added to the above flovor and a significant improvement in aroma and taste is noted. When this is evaluated in the aforementioned tasting solution, it is judged to have an improved grape character and grape fidelity. It contains more fresh concord grape character, true fruitiness with a nuance of wine. In addition, it is judged to be a more rounded and natural flavor, superior to the product made without the addition of 2-phenyl-3-carboethoxyfuran in both aroma and taste.

EXAMPLE XVI

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 0.02 parts of bis (cyclohexyl) disulfide is added to the above flavor and a significant improvement in aroma and taste is noted. It is judged to be a better blended flavor, more natural and reminiscent of natural grape. It imparts a certain mustiness and eliminates the typical methyl anthranilate character. It is a more rounded and natural flavor.

EXAMPLE XVII

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic Alcohol | .3 |
| Cognac oil | .1 |
| Ethyl alcohol | 73.6 |

The above mixture is judged to be an acceptable grape flavor when evaluated in a sweetened and acidified aqueous tasting solution. 0.04 Parts of bis (cyclohexyl) disulfide is added to the above flavor and a significant improvement in aroma and taste is noted. It is judged to be a better blended flavor, more natural and reminiscent of natural grape. It imparts a certain mustiness and elminates the typical methyl anthranilate character. It is a more rounded and natural flavor.

EXAMPLE XVIII

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 0.07 Parts of bis (cyclohexyl) disulfide is added to the above flavor and a significant improvement in aroma and taste is noted. It is judged to be a better blended flavor, more natural and reminiscent of natural grape. It imparts a certain mustiness and eliminates the typical methyl anthranilate character. It is a more rounded and natural flavor.

EXAMPLE XIX

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 0.12 Parts of bis (cyclohexyl) disulfide is added to the above flavor and a significant improvement in aroma and taste is noted. It is judged to a better blended flavor, more natural and reminiscent of natural grape. It imparts a certain mustiness and eliminates the typical anthranilate character. It is a more rounded and natural flavor.

EXAMPLE XX

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic Alcohol | .3 |
| Cognac oil | .1 |
| Ethyl alcohol | 73.6 |

The above mixture is judged to be an acceptable grape flavor when evaluated in a sweetened and acidified aqueous tasting solution. 0.15 Parts of bis (cyclohexyl) disulfide is added to the above flavor and a significant improvement in aroma and taste is noted. it is judged to be a better blended flavor, more natural and reminiscent of natural grape. It imparts a certain mustiness and eliminates the typical methyl anthranilate character. It is a more rounded and natural flavor.

EXAMPLE XXI

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 0.20 Parts of bis (cyclohexyl) disulfide is added to the above flavor and a significant improvement in aroma and taste is noted. It is judged to a better blended flavor, more natural and reminiscent of natural grape. It imparts a certain mustiness and eliminates the typical methyl anthranilate character. It is a more rounded and natural flavor.

EXAMPLE XXII

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 1.5 Parts of 2-phenyl-3-carboethoxyfuran and .02 parts of bis (cyclohexyl) disulfide is added to the above flavor and a significant improvement in aroma and taste is noted. This improvement is additive, not synergistic. It is judged to be a better blended, more natural flavor and reminiscent of natural concord grape. It is a more rounded and has more grape fidelity. It imparts a nuance of wine with a certain mustiness.

EXAMPLE XXIII

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 1.5 Parts of 2-phenyl-3-carboethoxyfuran and 0.04 parts of bis (cyclohexyl) disulfide is added to the above flavor and a significant improvement in aroma and taste is noted. It is judged to be a better blended, more natural flavor and reminiscent of natural concord grape. It is a more rounded and has more grape fidelity. It imparts a nuance of wine with a certain mustiness.

EXAMPLE XXIV

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 1.5 Parts of 2-phenyl-3-carboethoxyfuran and 0.06 parts of bis (cyclohexyl) disulfide is added to the above flavor and a significant improvement in aroma and taste is noted. It is judged to be a better blended, more natural flavor and reminiscent of natural concord grape. It is a more rounded and has more grape fidelity. It imparts a nuance of wine with a certain mustiness.

EXAMPLE XXV

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 1.5 Parts of 2-phenyl-3-carboethoxyfuran and 0.09 parts of bis (cyclohexyl) disulfide is added to the above flavor and a significant improvement in aroma and taste is noted. It is judged to be a better blended, more natural flavor and reminiscent of natural concord grape. It is a more rounded and has more grape fidelity. It imparts a nuance of wine with a certain mustiness.

EXAMPLE XXVI

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 1.5 Parts of 2-phenyl-3-carboethoxyfuran and 0.12 parts of bis (cyclohexyl) disulfide is added to the above flavor and a significant improvement in aroma and taste is noted. It is judged to be a better blended, more natural flavor and reminiscent of natural concord grape. It is a more rounded and has more grape fidelity. It imparts a nuance of wine with a certain mustiness.

EXAMPLE XXVII

The following mixture is prepared:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |

The above mixture is judged to be an acceptable grape flavor when evaluated in a sweetened and acidified aqueous tasting solution. 1.5 Parts of 2-phenyl-3-carboethoxyfuran and 0.15 parts of bis (cyclohexyl) disulfide is added to the above flavor and a significant improvement in aroma and taste is noted. It is judged to be a better blended, more natural flavor and reminiscent of natural concord grape. It is a more rounded and has more grape fidelity. It imparts a nuance of wine with a certain mustiness.

EXAMPLE XXVIII

The following materials are separately added to the grape flavor formulation set forth supra:

a. Cyclohexyl mercaptan having the structure:

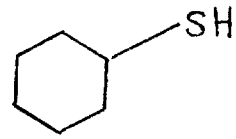

(U.S. Pat. No. 3,677,772; Mussinan)

b. Furfuryl valerate having the structure:

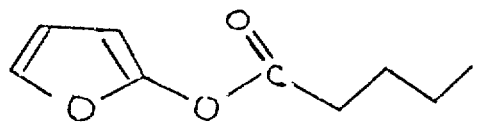

(U.S. Pat. No. 3,702,253; Winter et al.)

c. Bis (cyclohexyl) disulfide having the structure:

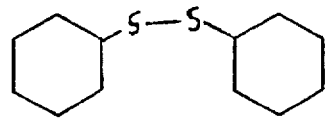

GRAPE FLAVOR FORMULATION:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 100 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful than the reconstituted grape juice to which the essence alone is added.

Conclusions:
Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXIX

The following materials are separately added to the grape flavor formulation set forth supra:

a. Cyclohexyl mercaptan having the structure:

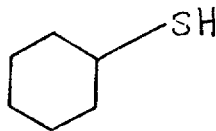

(U.S. Pat. No. 3,677,772; Mussinan)

b. Furfuryl valerate having the structure:

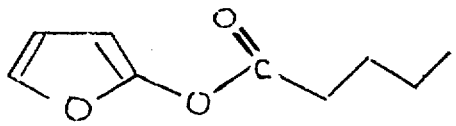

(U.S. Pat. No. 3,702,253; Winter et al)

c. Bis (cyclohexyl) disulfide having the structure:

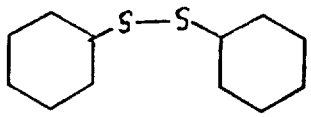

GRAPE FLAVOR FORMULATION:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl Methyl Phenyl Glycidate | 1.5 |
| Cinnamic alcohol | .3 |

-continued

GRAPE FLAVOR FORMULATION:

| Ingredients | Parts by Weight |
| --- | --- |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 500 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful than the reconstituted grape juice to which the essence alone is added.

Conclusions:
Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXX

The following materials are separately added to the grape flavor formulation set forth supra:

a. Cyclohexyl mercaptan having the structure:

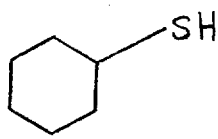

(U.S. Pat. No. 3,677,772; Mussinan)

b. Furfuryl valerate having the structure:

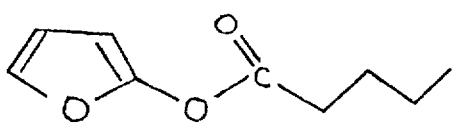

(U.S. Pat. No. 3,702,253; Winter et al.)

c. Bis (cyclohexyl) disulfide having the structure:

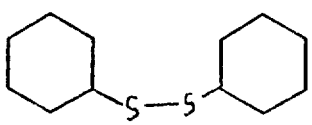

GRAPE FLAVOR FORMULATION:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 0.5% in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful than the reconstituted grape juice to which the essence alone is added.

Conclusions:
Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXXI

The following materials are separately added to the grape flavor formulation set forth supra:

a. Cyclohexyl mercaptan having the structure:

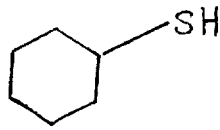

(U.S. Pat. No. 3,677,772; Mussinan)

b. Furfuryl valerate having the structure:

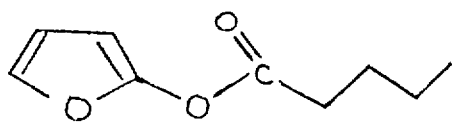

(U.S. Pat. No. 3,702,253; Winter et al.)

c. Bis (cyclohexyl) disulfide having the structure:

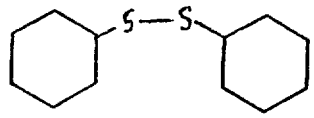

GRAPE FLAVOR FORMULATION:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 1% in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful than the reconstituted grape juice to which the essence alone is added.

Conclusions:
Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXXII

The following materials are separately added to the grape flavor formulation set forth supra:

a. Cyclohexyl mercaptan having the structure:

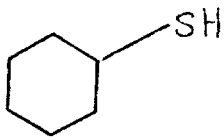

(U.S. Pat. No. 3,677,772; Mussinan)

b. Furfuryl valerate having the structure:

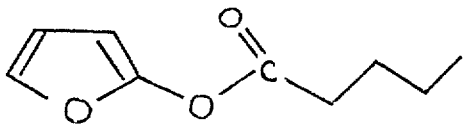

c. 2-Phenyl-3-carboethoxyfuran having the structure:

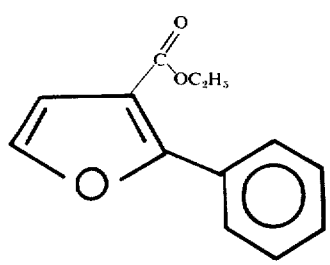

GRAPE FLAVOR FORMULATION:

| Ingredients | Parts by Weight |
|---|---|
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 50 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXXIII

The following materials are separately added to the grape flavor formulation set forth supra:

a. Cyclohexyl mercaptan having the structure:

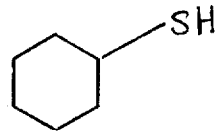

(U.S. Pat No. 3,677,772; Mussinan)

b. Furfuryl valerate having the structure:

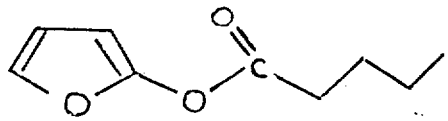

(U.S. Pat. No. 3,702,253; Winter et al.)

c. 2-Phenyl-3-carboethoxyfuran having the structure:

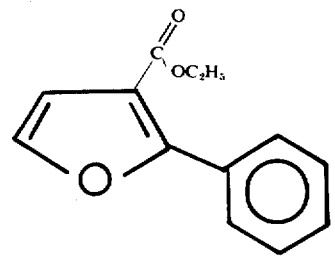

GRAPE FLAVOR FORMULATION:

| Ingredients | Parts by Weight |
|---|---|
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 300 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material(a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXXIV

The following materials are separately added to the grape flavor formulation set forth supra:

a. Cyclohexyl mercaptan having the structure:

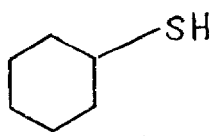

(U.S. Pat. No. 3,677,772; Mussinan)

b. Furfuryl valerate having the structure:

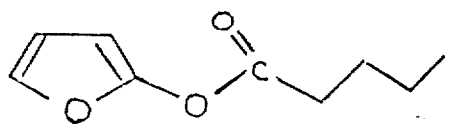

(U.S. Pat. No. 3,702,253; Winter et al.)

c. 2-Phenyl-3-carboethoxyfuran having the structure:

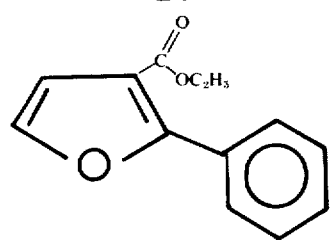

GRAPE FLAVOR FORMULATION:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46°,Brix is obtained which is combined with 100-fold natural grape essence in the ratio of 100:1. To this is added sufficient flavor as set forth above to provide a level of 0.5% in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful than the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXXV

The following materials are separately added to the grape flavor formulation set forth supra:

a. Cyclohexyl mercaptan having the structure:

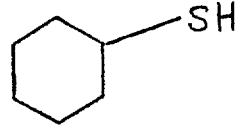

(U.S. Pat. No. 3,677,772; Mussinan)

b. Furfuryl valerate having the structure:

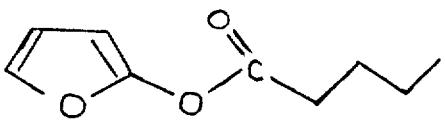

(U.S. Pat. No. 3,702,253; Winter et al.)

c. 2-Phenyl-3-carboethoxyfuran having the structure:

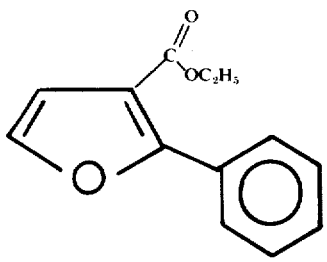

GRAPE FLAVOR FORMULATION:

| Ingredients | Parts by Weight |
| --- | --- |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 1% in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful than the reconstituted grape juice to which the essence alone is added.

Conclusions:
Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXXVI

The following materials are separately added to the grape flavor formulation set forth supra:

a. Cyclohexyl mercaptan having the structure:

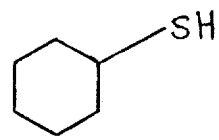

b. Furfuryl valerate having the structure:

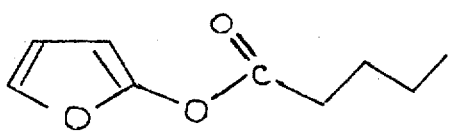

(U.S. Pat. No. 3,702,253; Winter et al.)

c. A mixture of 2-phenyl-3-carboethoxyfuran having the structure:

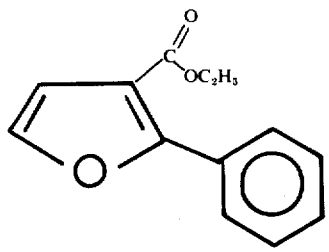

and bis (cyclohexyl) disulfide having the the structure:

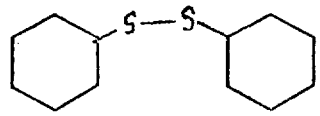

wherein the 2-phenyl-3-carboethoxyfuran and bis (cyclohexyl) disulfide is in a ratio of 1.5 parts by weight of 2-phenyl-3-carboethoxyfuran and 0.02 parts by weight of bis (cyclohexyl) disulfide.

GRAPE FLAVOR FORMULATION:

| Ingredients | Parts by Weight |
| --- | --- |
| Methyl Anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 50 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful than the reconstituted grape juice to which the essence alone is added.

Conclusions:
Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXXVII

The following materials are separately added to the grape flavor formulation set forth supra:

a. Cyclohexyl mercaptan having the structure:

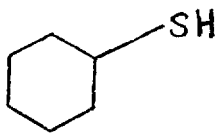

(U.S. Pat. No. 3,677,772; Mussinan)

b. Furfuryl valerate having the structure:

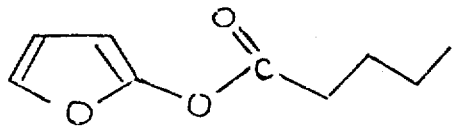

(U.S. Pat. No. 3,702,253; Winter et al.)

c. A mixture of 2-phenyl-3-carboethoxyfuran having the structure:

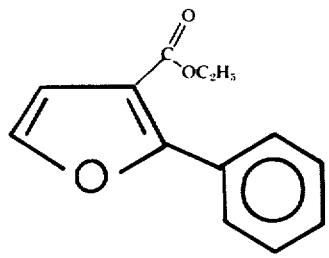

and bis (cyclohexyl) disulfide having the structure:

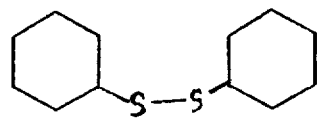

wherein the 2-phenyl-3-carboethoxyfuran and bis (cyclohexyl) disulfide is in a ratio of 1.5 parts by weight of 2-phenyl-3-carboethoxyfuran and 0.04 parts by weight of bis (cyclohexyl) disulfide.

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 250 ppm in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful than the reconstituted grape juice to which the essence alone is added.

Conclusions:
Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXXVIII

The following materials are separately added to the grape flavor formulation set forth supra:

a. Cyclohexyl mercaptan having the structure:

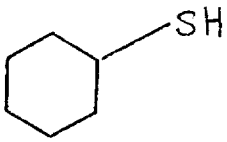

(U.S. Pat. No. 3,677,772; Mussinan)

b. Furfuryl valerate having the structure:

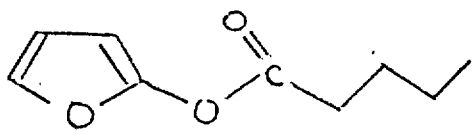

(U.S. Pat. No. 3,702,253; Winter et al.)

c. A mixture of 2-phenyl-3-carboethoxyfuran having the structure:

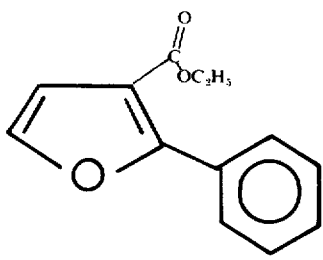

and bis (cyclohexyl) disulfide having the structure:

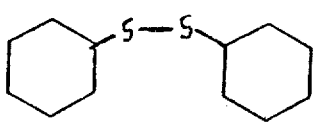

wherein the 2-phenyl-3-carboethoxyfuran and bis (cyclohexyl) disulfide is in a ratio of 1.5 parts by weight of 2-phenyl-3-carboethoxyfuran and 0.10 parts by weight of bis (cyclohexyl) disulfide.

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butylate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 1% in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a):
At the levels added material (a) is detrimental to the grape flavor and gives it a meaty quality.

b. Reconstituted grape juice containing material (b):
At the levels added material (b) is detrimental to the grape flavor and gives it a meaty quality.

c. Reconstituted grape juice with formulation containing (c) added:
The natural grape juice and the reconstituted grape juice containing the formulation with (c) added are substantially familiar and substantially more flavorful than the reconstituted grape juice to which the essence alone is added.

Conclusions:
Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XXXIX

The following materials are separately added to the grape flavor formulation set forth supra:

a. Cyclohexyl mercaptan having the structure:

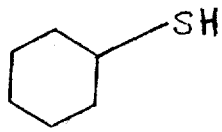

(U.S. Pat. No. 3,677,772; Mussinan)

b. Furfuryl valerate having the structure:

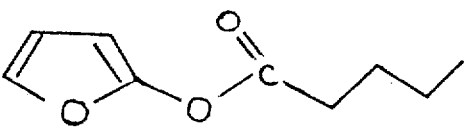

(U.S. Pat. No. 3,702,253; Winter et al.)

c. A mixture of 2-phenyl-3-carboethoxyfuran having the structure:

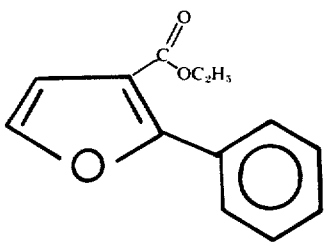

and bis (cyclohexyl) disulfide having the structure:

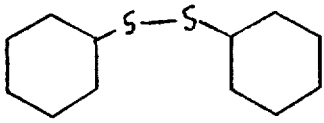

wherein the 2-phenyl-3-carboethoxyfuran and bis (cyclohexyl) disulfide is in a ratio of 1.5 parts by weight of 2-phenyl-3-carboethoxyfuran and 0.15 parts by weight of bis (cyclohexyl) disulfide.

| GRAPE FLAVOR FORMULATION: | |
|---|---|
| Ingredients | Parts by Weight |
| Methyl anthranilate | 11.0 |
| Ethyl acetate | 9.0 |
| Ethyl anthranilate | 2.5 |
| Ethyl butyrate | 2.0 |
| Ethyl methyl phenyl glycidate | 1.5 |
| Cinnamic alcohol | .3 |
| Cognac oil | .1 |
| Ethyl alcohol | 73.6 |
| Flavoring material which is the subject of experiment (in the alternative one of (a), (b) or (c) | 1.52 |

A grape juice concentrate is prepared from natural grape juice by a vacuum evaporation process. A concentration of 46° Brix is obtained which is combined with 100-fold natural grape essence in the ratio of 100:1. To this is added sufficient flavor as set forth above to provide a level of 0.4% in reconstituted grape juice prepared from the concentrate. The reconstituted grape juice produced using the test compounds in the above flavor formulation are then compared with one another and with reconstituted grape juice to which natural grape essence alone has been added and to natural grape juice. The results of the investigation and the conclusions reached as the result of same follow:

a. Reconstituted grape juice containing material (a): At the levels added material (a) is detrimental to the grape flavor and gives it a meaty quality.

b. Reconstituted grape juice containing material (b): At the levels added material (b) is detrimental to the grape flavor and gives it a meaty quality.

c. Reconstituted grape juice with formulation containing (c) added:

The natural grape juice and the reconstituted grape juice containing the formulation with (c) added are substantially familiar and substantially more flavorful tnan the reconstituted grape juice to which the essence alone is added.

Conclusions:

Comparing (a), (b) and (c) the only material which gives rise to advantageous results when added to reconstituted grape juice or grape juice per se is material (c). Material (c) has unexpected, unobvious and advantageous qualities insofar as grape flavor is concerned when compared with the organoleptic properties of materials (a) and (b).

EXAMPLE XL

The following flavor materials are separately added to the grape juice prepared as set forth below:

1. FLAVOR MATERIAL a. Cyclohexyl mercaptan having the structure:

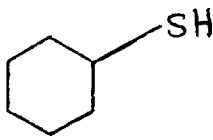

(U.S. Pat. No. 3,677,772; Mussinan)

b. Furfuryl valerate having the structure:

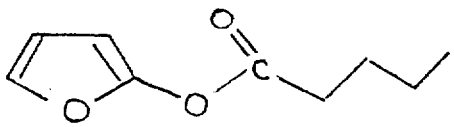

(U.S. Pat. No. 3,702,253; Winter et al.)

c. A mixture of 2-phenyl-3-carboethoxyfuran having the structure:

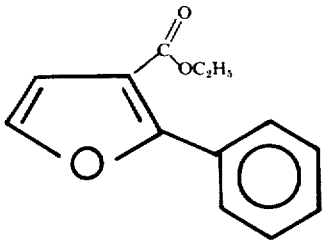

and bis (cyclohexyl) disulfide having the structure:

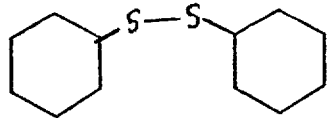

wherein the 2-phenyl-3-carboethoxyfuran and bis (cyclohexyl) disulfide is in a ratio of 1.5 parts by weight of 2-phenyl-3-carboethoxyfuran and 0.02 parts by weight of bis (cyclohexyl) disulfide.

d. 2-Phenyl-3-carboethoxyfuran having the structure:

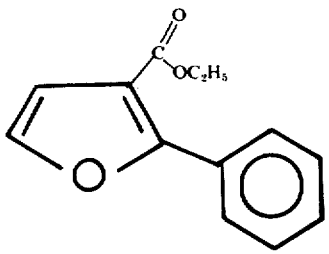

e. Bis (cyclohexyl) disulfide having the structure:

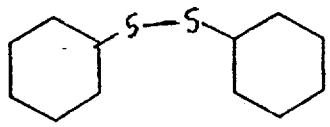

f. A mixture of 2-phenyl-3-carboethoxyfuran having the structure:

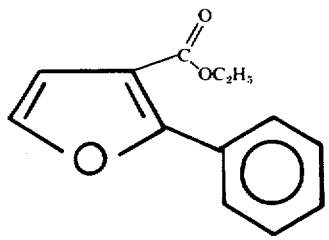

and bis (cyclohexyl) disulfide having the structure:

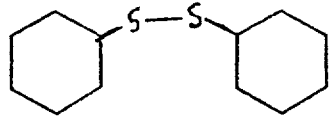

wherein the 2-phenyl-3-carboethoxyfuran and bis (cyclohexyl) disulfide is in a ratio of 1.5 parts by weight of 2-phenyl-3-carboethoxyfuran and 0.15 parts by weight of bis (cyclohexyl) disulfide.

II. GRAPE JUICE

A grape juice concentrate is prepared from natural grape juice by a vacuum evaporation process. A concentration of 46° Brix is obtained which is combined with 100-fold natural grape essence in the ratio of 100:1. To this is added sufficient flavor material as set forth above to provide a level of 0.5% reconstituted grape juice prepared from the concentrate. The reconstituted grape juice produced using the above test flavor materials are then compared with one another and with reconstituted grape juice to which natural grape essence alone has been added and to natural grape juice. The results of the investigation and the conclusions reached as the result of same follow:

a. Reconstituted grape juice containing material (a):
  At the levels added material (a) is detrimental to the grape flavor and gives it a meaty quality.
b. Reconstituted grape juice containing material (b):
  At the levels added material (b) is detrimental to the grape flavor and gives it a meaty quality.
c. Reconstituted grape juice containing (c), (d), (e) or (f) added:
  The natural grape juice and the reconstituted grape juice containing (c), (d), (e), or (f) added are substantially similar and substantially more flavorful than the reconstituted grape juice to which the essence alone is added.

Conclusions:

Comparing (a), (b), (c), (d), (e) and (f), the materials which give rise to advantageous results when added to reconstituted grape juice or grape juice per se are materials (c), (d), (e) and (f). Materials (c), (d), (e) and (f) have unexpected, unobvious and advantageous qualities insofar as grape flavor is concerned when compared with the organoleptic properties of materials (a) and (b).

EXAMPLE XLI

20 Grams of the flavor formulation of each of Examples XVI–XXVII is emulsified in a solution containing 100 gms gum arabic and 300 gms water. The emulsion is spray-dried with a Bowen Lab Model Drier utilizing 250 c.f.m. of air with an inlet temperature of 500° F., an outlet temperature of 200°F., and a wheel speed of 50,000 r.p.m.

EXAMPLE XLII

8 Grams of each of the following materials:
a. 2-Phenyl-3-carboethoxyfuran;
b. Bis (cyclohexyl) disulfide;
c. 1.5:0.002 mixture (wt./wt.) of 2-phenyl-3-carboethoxyfuran:bis (cyclohexyl) disulfide;
d. 1.5:0.04 mixture (wt./wt.) of 2-phenyl-3-carboethoxyfuran:bis (cyclohexyl) disulfide;
e. 1.5:0.06 mixture (wt./wt.) of 2-phenyl-3-carboethoxyfuran:bis (cyclohexyl) disulfide;
f. 1.5:0.10 mixture (wt./wt.) of 2-phenyl-3-carboethoxyfuran:bis (cyclohexyl) disulfide;
g. 1.5:0.15 mixture (wt./wt.) of 2-phenyl-3-carboethoxyfuran:bis (cyclohexyl) disulfide.

is separately emulsified in a solution containing 100 gms gum arabic and 300 gms water. The emulsion is spray-dried with a Bowen Lab Model Drier utilizing 250 c.f.m. of air with an inlet temperature of 500° F., an oulet temperature of 200° F., and a wheel speed of 50,000 r.p.m.

EXAMPLE XLIII

Chewing gum

100 Parts by weight of chicle are mixed with 4 parts by weight of each of the flavors prepared in accordance with Example XLI, 300 parts of sucrose and 100 parts of corn syryp are added. Mixing is effected in a ribbon blender with jacketed side walls of the type manufactured by the Baker Perkins Company. The resulting material is formed into 1 inch × 3 inches × 0.1 inch slabs. Each slab of chewing gum has an excellent long lasting grape flavor.

EXAMPLE XLIV

Chewing gum

100 Parts by weight of chicle are mixed with 18 parts by weight of each of the flavors prepared in accordance with Example XLII. 300 Parts of sucrose and 100 parts of corn syrup are then added. Mixing is effected in a ribbon blender with jacketed side walls of the type manufactured by the Baker Perkins Company. The resulting material is formed into 1 inch × 3 inches × 0.1 inch slabs. Each slab of chewing gum has an excellent, long-lasting sweet, fruity, grapelike taste.

EXAMPLE XLV

A tobacco blend is made up by mixing the following materials:

| Ingredient | Parts by Weight |
|---|---|
| Bright | 40.1 |
| Burley | 24.9 |
| Maryland | 1.1 |
| Turkish | 11.6 |
| Stem (flue-cured) | 14.2 |
| Glycerine | 2.8 |
| Water | 5.3 |

The above tobacco is used in producing cigarettes and the following formulation is compounded and incorporated into each of these cigarettes:

| Ingredient | Parts by Weight |
|---|---|
| Ethyl butyrate | .05 |
| Ethyl valerate | .05 |
| Maltol | 2.00 |
| Cocoa Extract | 26.00 |
| Coffee Extract | 10.00 |
| Ethyl alcohol | 20.00 |
| Water | 41.90 |

The above flavor is incorporated into a model cigarette at 1–2%. Half of these model cigarettes are treated with the 2-phenyl-3-carboethoxyfuran at 100 to 300 ppm per cigarette. When evaluated by paired comparison the cigarettes treated with the 2-phenyl-3-carboethoxyfuran is found to be more aromatic and richer in aroma, i.e., having a well pronounced, pleasant, full aroma, sweet and persistant resinous balsamic-like character. In smoking, the cigarettes treated with the 2-phenyl-3-carboethoxyfuran are found to be more aromatic, sweeter and slightly less harsh.

What is claimed is:

1. The process of altering the flavor properties of foodstuffs which comprises adding thereto a small but effective amount to enhance grape flavor of a mixture comprising 2-phenyl-3-carboethoxyfuran and bis (cyclohexyl) disulfide wherein the weight ratio of 2-phenyl-3-carboethoxyfuran: bis (cyclohexyl) disulfide is from 1.5: 0.02 up to 1.5:0.15.

2. The process of claim 1 wherein the consumable material is a foodstuff selected from the group consisting of a chewing gum and a beverage.

3. A grape flavor modifying composition containing a mixture comprising 2-phenyl-3-carboethoxyfuran and bis (cyclohexyl) disulfide wherein the weight ratio of 2-phenyl-3-carboethoxyfuran: bis (cyclohexyl) disulfide is from 1.5:0.02 up to 1.5:0.15 and as a flavor adjuvant a compound selected from the group consisting of methyl anthranilate, ethyl acetate, ethyl anthranilate, ethyl butyrate, ethyl methyl phenyl glycidate, cinnamyl alcohol, amyl valerianate, cinnamyl propionate, rhodinyl acetate, methyl-beta-hydroxy butyrate, and ethyl-beta-hydroxy butyrate.

* * * * *